(12) United States Patent
Shih et al.

(10) Patent No.: US 11,019,671 B2
(45) Date of Patent: *May 25, 2021

(54) METHODS AND RELATED DEVICES FOR SECONDARY NODE ADDITION

(71) Applicant: FG Innovation Company Limited, Tuen Mun (HK)

(72) Inventors: Mei-Ju Shih, Hsinchu (TW); Chie-Ming Chou, Hsinchu (TW); Yung-Lan Tseng, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,643

(22) Filed: Mar. 3, 2020

(65) Prior Publication Data

US 2020/0205214 A1     Jun. 25, 2020

Related U.S. Application Data

(63) Continuation of application No. 16/047,011, filed on Jul. 27, 2018, now Pat. No. 10,631,353.

(Continued)

(51) Int. Cl.
*H04W 76/15* (2018.01)
*H04W 48/16* (2009.01)
*H04W 48/20* (2009.01)
*H04W 76/20* (2018.01)
*H04J 11/00* (2006.01)

(Continued)

(52) U.S. Cl.
CPC ........... *H04W 76/15* (2018.02); *H04W 48/16* (2013.01); *H04W 48/20* (2013.01); *H04J 11/0069* (2013.01); *H04L 41/5025* (2013.01); *H04W 76/20* (2018.02); *H04W 76/27* (2018.02)

(58) Field of Classification Search
CPC .. H04W 76/046; H04W 76/27; H04L 41/5025
See application file for complete search history.

(56) References Cited

U.S. PATENT DOCUMENTS 10,631,353 B2 *   4/2020   Shih ..................... H04W 48/16
2015/0124748 A1   5/2015   Park
(Continued)

FOREIGN PATENT DOCUMENTS

| JP | 2015530042 A | 11/2016 |
|---|---|---|
| KR | 10-20160079241 A1 | 7/2016 |
| KR | 101708574 B2 | 2/2017 |

OTHER PUBLICATIONS

NOKIA New Radio Bearer Reconfiguration Test Cases to Verify New Ciphering and Integrity Protection Algorithms in Rel-7 3GPP TSG RAN WG R5 Meeting #39 R5-081507 May 9, 2008(May 9, 2008) the whole document.

(Continued)

*Primary Examiner* — Salvador E Rivas
(74) *Attorney, Agent, or Firm* — ScienBiziP, P.C.

(57) ABSTRACT

A method for secondary node addition is provided. The method includes receiving, by a UE, a first RRC connection reconfiguration message from a master node, adding, by the UE, a secondary node in response to the first RRC connection reconfiguration message; and transmitting, by the UE, an RRC connection reconfiguration complete message to the secondary node via SRB3.

14 Claims, 10 Drawing Sheets

Related U.S. Application Data

(60) Provisional application No. 62/537,702, filed on Jul. 27, 2017.

(51) Int. Cl.
    *H04L 12/24*     (2006.01)
    *H04W 76/27*     (2018.01)

(56) References Cited

U.S. PATENT DOCUMENTS

| | | | |
|---|---|---|---|
| 2015/0173047 A1 | 6/2015 | Yamada | |
| 2016/0338138 A1* | 11/2016 | Pelletier | H04W 72/042 |
| 2017/0331670 A1* | 11/2017 | Parkvall | H04W 52/0229 |
| 2019/0268799 A1* | 8/2019 | Hong | H04W 40/04 |

OTHER PUBLICATIONS

Working Group C LTE Small Cell Enhancement by Dual Connectivity OUTLOOK Visions and research directions for the Wireless World Nov. 15, 2014 (Nov. 15, 2014) p. 13-p. 14.

3GPP, TS 36.300 v14.3.0, E-UTRA and E-UTRAN - Overall description; Stage 2 (Release 14), Jun. 2017 3GPP, the whole document.

CMCC, the configuration issues of SCG SRBI[online], 3GPP TTG RAN WG2 #98 R2-1705795, May 7, 2017, the whole document.

LG Electronics Inc., 3GPP TSG RAN WG3 #95bis R3-170945, Mar. 25, 2017, the whole document.

Huawei, HiSilicon, Remaining issues on SCG SRB Configuration, 3GPP TSG RAN WG2 adhoc_2017_06_NR R2-1707418, Jun. 17, 2017, the whole document.

\* cited by examiner

METHODS AND RELATED DEVICES FOR SECONDARY NODE ADDITION

CROSS-REFERENCE TO RELATED APPLICATIONS

This application is a continuation application of U.S. patent application Ser. No. 16/047,011 filed Jul. 27, 2018, which claims the benefit of and priority to provisional U.S. Patent Application Ser. No. 62/537,702 filed on Jul. 27, 2017. The contents of all above-named applications are fully incorporated herein by reference for all purposes.

FIELD

The present disclosure generally relates to wireless communication technology, and more particularly, to methods and related devices for secondary node addition.

BACKGROUND

In the next-generation (e.g., fifth generation (5G) New Radio (NR)) wireless network, multi-connectivity (MC) including dual-connectivity (DC) is envisioned to support more capacity, data, and services. A user equipment (UE) configured with multi-connectivity may have one master node as an anchor and one or more secondary nodes. For example, a UE in multi-connectivity may be configured with one master cell group (MCG) and one or more secondary cell groups (SCGs) for data delivery. Each cell group may be formed by one or more cells. All cell groups are not necessarily the same type. For example, one can be a Long Term Evolution (LTE) or an evolved LTE (eLTE) cell group, while another one can be an NR cell group. Regarding to the core network, taking E-UTRA (Evolved Universal Terrestrial Radio Access) for example, the core network that E-UTRA connects to can be the Evolved Packet Core (EPC) or NextGen Core (NGC) or 5G Core Network (5GC). eLTE is also known as LTE connected to 5GC. In NR-NR DC case and Multi-RAT (MR)-DC (e.g., NR-NR DC, EN (E-UTRAN New Radio)-DC, or New Radio E-UTRAN (NE)-DC) case, each network node may have its own Radio Resource Control (RRC) entity, but the UE's RRC entity may follow that of the master node.

While a UE in multi-connectivity may maintain simultaneous connections with the master node and the secondary node(s), in some cases, the UE may not camp to a cell even though the cell is suitable for being the UE's secondary node.

Thus, there is a need in the art for an improved secondary node addition mechanism for multi-connectivity.

SUMMARY

The present disclosure is directed to methods and related devices for secondary node addition.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1A:
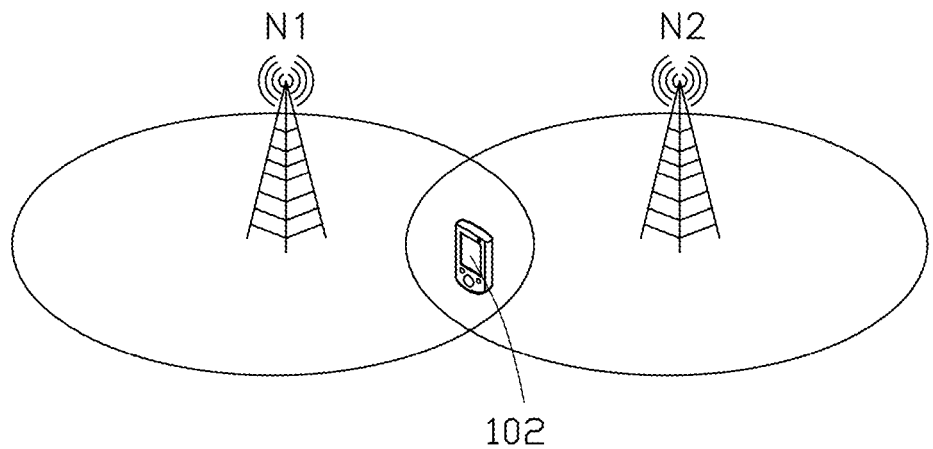
FIG. 1A and FIG. 1B are schematic diagrams illustrating two multi-connectivity scenarios.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), a 5G Core Network (5GC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an ng-eNB as in an E-UTRA base station in connection with the 5GC, a next generation node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

Figure 1B:
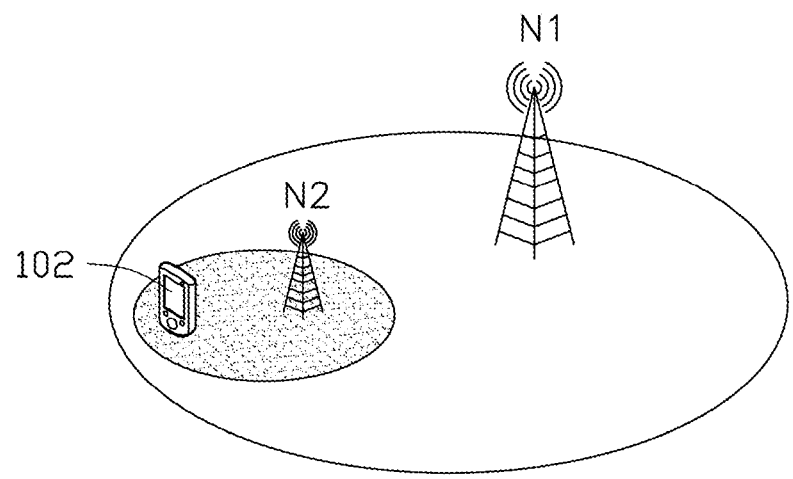

FIG. 1A and FIG. 1B are schematic diagrams illustrating two multi-connectivity scenarios. To simplify the description, FIG. 1A and FIG. 1B only depict a UE 102, a cell N1 and a cell N2. However, as can be readily appreciated by those of ordinary skill in the art, the multi-connectivity scenarios can be extended to include several UEs and several cells. For example, the multi-connectivity can be built by considering that the cell N1 coordinates with multiple cells that function like the cell N2.

In FIG. 1A, the cell N1 provides a coverage area partially overlapped with a coverage area of the cell N2. In FIG. 1B, a coverage area of the cell N1 encompasses the coverage area of the cell N1. The cell N1 and the cell N2 may belong to the same or different Radio Access Technologies (RATs). For example, the cell N1 and the cell N2 may be NR cells using NR RAT. In another example, the cell N1 and the cell N2 may apply other types of RATs such as (e)LTE.

In the present implementation, the UE 102 may access to the cell N1 as the master node. The cell N1 may add the cell N2 as a secondary node to support the UE's service requirement. For illustrative purposes, the master node and the secondary node are exemplified as the cell N1 and the cell N2, respectively. However, it should be understood that the present disclosure is not limited thereto. For example, the master node and the secondary node may each include several cells.

One of the reasons the UE 102 does not camp to the cell N2 directly may be because the UE 102 is barred by the cell N2, although the signal quality between the UE 102 and the cell N2 may be good and the cell N2 can support the service requirement of the UE 102. Thus, the UE 102 may establish an RRC connection to another cell (e.g., cell N1) as the master node, rather than the cell N2. Another reason may be that the coverage of the cell N1 is more extensive than that of the cell N2, as shown in FIG. 1B.

Figure 2:
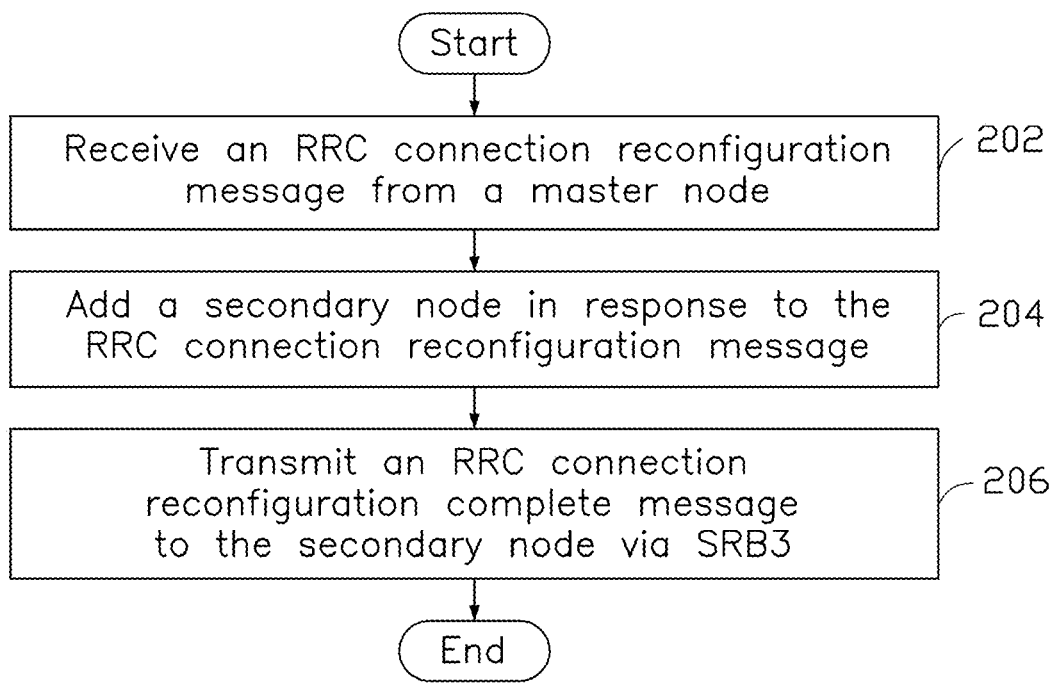
FIG. 2 is a flowchart illustrating a method for secondary node blind addition, in accordance with an example implementation of the present disclosure.

FIG. 2 is a flowchart illustrating a method for secondary node blind addition (called "blind addition" for short), in accordance with an example implementation of the present disclosure. Compared to normal secondary node addition (called "normal addition" for short) procedure, blind addition is another type of secondary node addition procedure, in which the master node may be allowed to add one or more secondary nodes for a UE, without configuring the UE to perform specific measurements as a basis for selecting the secondary node(s).

One of ordinary skill in the art may understand that the illustrated order of actions is illustrative only and the order of the actions may change in response to the present disclosure. Additional actions can be added or fewer actions may be utilized, without departing from this disclosure. Moreover, for the convenience of description, the elements presented in the implementations sharing the same labeling are the same (or similar) elements, and the description of which are as aforementioned.

In action 202, a UE (e.g., the UE 102 in FIG. 1A/1B) may receive an RRC connection reconfiguration message from a master node (e.g., the cell N1 in FIG. 1A/1B).

In one implementation, the RRC connection reconfiguration message may include a secondary node's (e.g., the cell N2 in FIG. 1A/1B) configuration, and/or the required information to access the secondary node. For example, the RRC connection reconfiguration message may include at least one of: a cell Identity (ID), a beam configuration, an association between Random Access Channel (RACH) resources and Channel State Information-Reference Signal (CSI-RS) configuration, an association between RACH resources and New Radio-Synchronization Signal (NR-SS) configuration, a Signaling Radio Bearer (SRB) configuration, a Data Radio Bearer (DRB) configuration, a Scheduling Request (SR) configuration, and an indication of access category in the cell N2. In one implementation, the SRB configuration may include the SRB3 configuration. The SRB3 is regarded as the signal radio bearer between the UE and the secondary node.

In action 204, the UE 102 may add the cell N2 as a secondary node in response to the RRC connection reconfiguration message.

In action 206, the UE 102 may transmit an RRC connection reconfiguration complete message to the cell N2.

In one implementation, the RRC connection reconfiguration complete message is transmitted to the cell N2 via SRB3.

Figure 3:
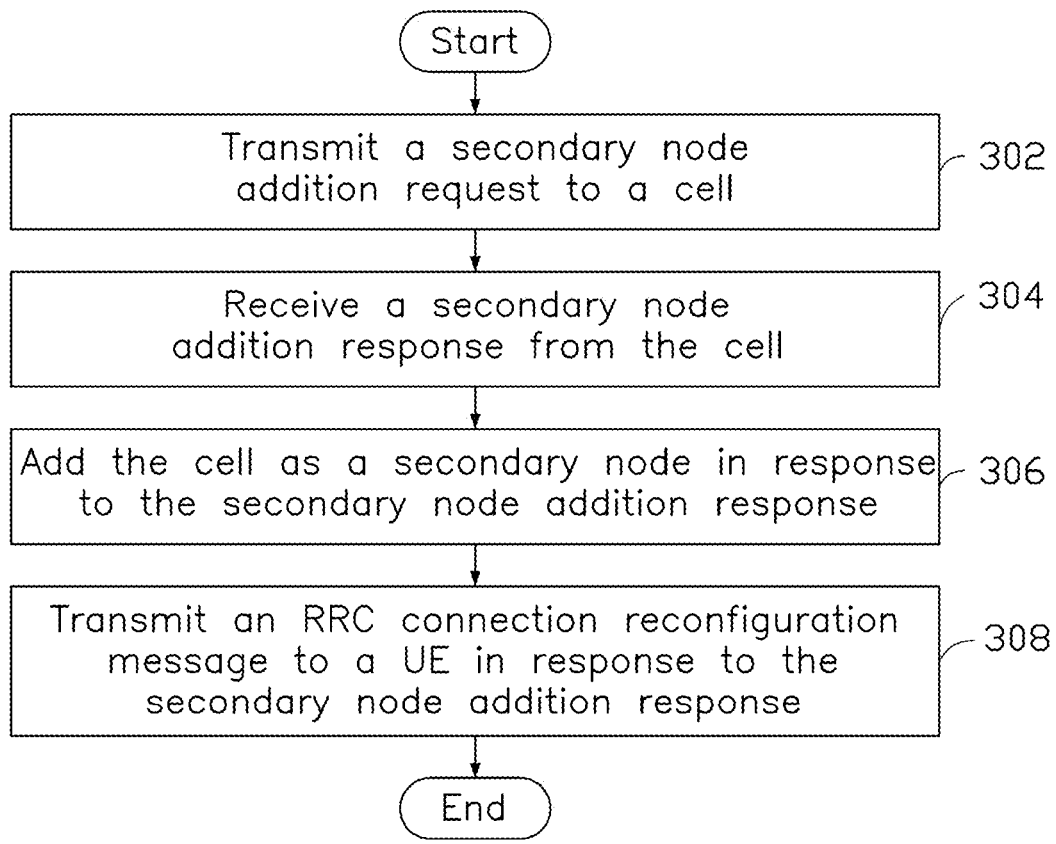
FIG. 3 is a flowchart illustrating a method for secondary node blind addition, in accordance with an example implementation of the present disclosure.

FIG. 3 is a flowchart illustrating a method for secondary node blind addition, in accordance with an example implementation of the present disclosure. In the present implementation, the method may be performed by a base station which provides at least one cell (e.g., the cell N1 in FIG. 1A/1B), and acts as (or as a part of) the master node of a UE (e.g., the UE 102 in FIG. 1A/1B).

In action 302, the base station may transmit a secondary node addition request to a cell (e.g., cell N2).

In action 304, the base station may receive a secondary node addition response from the cell N2.

In one implementation, the secondary node addition response may contain the required information for the UE 102 to access the cell N2. For example, the secondary node addition response may include at least one of: a UE ID, a beam configuration, an association between RACH resources and CSI-RS configuration, an association between RACH resources and NR-SS configuration, an SRB configuration (e.g., an SRB3 configuration), a DRB configuration, an SR configuration, and an indication of access category in the cell N2.

In action 306, the base station may add the cell N2 as a secondary node in response to the secondary node addition response.

In action 308, the base station may transmit an RRC connection reconfiguration message to the UE 102 in response to the secondary node addition response message. For example, the base station may encapsulate the secondary node addition response into the RRC connection reconfiguration message.

Figure 4:
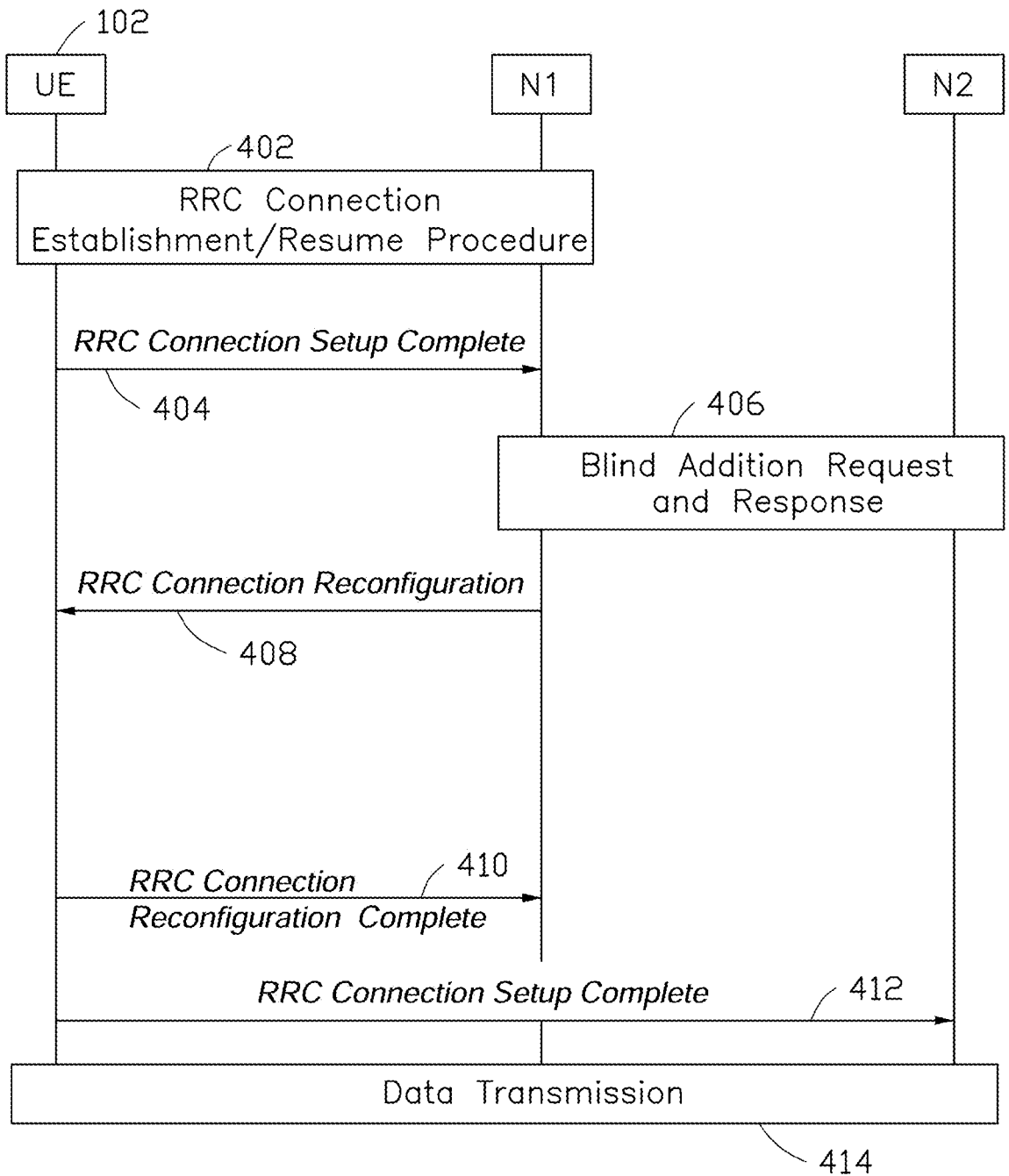
FIG. 4 is a message flow diagram illustrating a secondary node blind addition procedure, in accordance with an example implementation of the present disclosure.

FIG. 4 is a message flow diagram illustrating a secondary node blind addition procedure, in accordance with an example implementation of the present disclosure.

In the present implementation, the UE 102 may conduct a cell selection procedure to find suitable cell(s) for multi-connectivity. For example, before the UE 102 builds an RRC connection to the cell N1, the UE 102 may measure the signal quality to both the cell N1 and the cell N2. The signal quality between the UE 102 to the cell N1 and that between the UE 102 to the cell N2 may be both acceptable and suitable for the UE 102. In such a case, the cell N1 and the cell N2 may both satisfy the UE's cell (re)selection criteria (e.g., cell selection criterion S, cell ranking criterion R). For some criteria (e.g., the signal quality between the UE 102 and the cell N2 can be better than that between the UE 102 and the cell N1), the UE 102 may want to access the cell N2 instead of the cell N1. However, it is possible that the UE 102 is barred by the cell N2 because of an access barring mechanism or the UE 102 has an RRC connection failure (e.g., connection establishment failure) with the cell N2. In such a case, the UE 102 may turn to the cell N1 and successfully establish an RRC connection to the cell N1. The cell N1 may serve as the master node to the UE 102. Thus, the procedure in FIG. 4 can be helpful for the UE 102 to add the cell N2 as a secondary node via the cell N1.

In one implementation, the procedure in FIG. 4 may be applied for the situations that the UE 102 knows the measurement results of the cell N2 and considers it as a suitable cell for data transmission and service support. However, for some reasons (e.g., the UE 102 is barred by the cell N2), the UE 102 may access another cell (e.g., the cell N1), and add the cell N2 as a secondary node via the cell N1.

In one implementation, the UE 102 may not know the suggested cells for the secondary node addition (e.g., blind addition, normal addition), or the UE 102 may implicitly report the suggested cells to the master node (e.g., the cell N1). In such case, the cell N1 may then add the secondary node (e.g., the cell N2) on its own.

In one implementation, the UE 102 may measure the signal quality to a couple of cells, which may be provided by the network, and/or are previously camped to, and/or nearby cells, so as to find the suitable cells for multi-connectivity.

In one implementation, one cell may broadcast inter-frequency cell IDs, intra-frequency cell IDs, neighboring cell IDs, zone IDs, and/or area IDs. Then, the UE 102 may base on the broadcast information (e.g., provided by the cell N1) to measure the signal quality of other cells. For example, the UE 102 may measure the beam quality to an NR cell via NR-Synchronization Signal (NR-SS), and/or Channel State Information-Reference Signal (CSI-RS) of each NR cell, so that the UE 102 may derive the cell quality on its own based on the measurement results of NR-SS and/or CSI-RS.

In one implementation, the cells within a certain zone or area may broadcast the same zone ID or area ID. For example, the cell N1 may broadcast its own zone ID and/or area ID, which may reveal the zone/area to which the cell N1 belongs. The UE 102 may perform the measurement to a group of cells with the indicated zone IDs and/or area IDs, which are in the same zone/area as the cell N1.

In one implementation, the cell N1 may broadcast neighboring zone IDs and/or area IDs. Such zone IDs and/or area IDs may indicate the UE 102 to perform the measurement to a group of cells with the indicated zone IDs and/or area IDs, which are in the neighboring zones/areas.

In one implementation, the UE 102 may be (pre)configured with a threshold for the cell selection procedure. The UE 102 may select one or more suitable cells for multi-connectivity, or rank the cells based on the threshold. For example, a cell considered suitable for the UE 102 to camp on may be at least with a signal quality better than the threshold. Among the suitable cells, the UE 102 may select one to camp, and perform an RRC connection establishment.

As shown in FIG. 4, in action 402, the UE 102 may perform an RRC connection establishment/resume procedure with the cell N1.

In action 402, the UE 102 may have finished preamble transmission and random access response reception from the cell N1, and plan to move from an RRC idle state to an RRC connected state, or from an RRC inactive (or light connected) state to an RRC connected state.

For example, if the UE 102 is to move from the RRC idle state to the RRC connected state, the UE 102 may transmit an RRC connection request message via Signaling Radio Bearer 0 (SRB0) to the cell N1, and the cell N1 may reply with an RRC connection setup message via SRB0 to the UE 102, for the RRC idle to the RRC connected transition. In another example, when the UE 102 transitions from the RRC inactive (or light connected) state to the RRC connected state, the UE 102 may transmit an RRC connection resume request message via SRB0 to the cell N1, and the cell N1 may reply with an RRC connection resume message via SRB1.

In the present implementation, if the UE 102 is to add a secondary node (e.g., the cell N2) via the master node (e.g., the cell N1) without measurement configurations from the master node (e.g., a UE-assisted blind addition), the UE 102 may transmit a blind addition request to the cell N1 via an RRC message (e.g., an RRC connection request message or an RRC connection resume request message) in the RRC connection establishment/resume procedure. The cell N1 may then reply the UE 102 with a blind addition response via an RRC connection setup message (or an RRC connection resume message) in the RRC connection establishment/resume procedure.

In one implementation, the blind addition response may indicate that the blind addition request is accepted, or the relative resources for the RRC establishment is granted while the blind addition request is rejected, or both the RRC establishment and the blind addition request are rejected.

In one implementation, the blind addition request may be realized by an indicator (e.g., at least one bit) added in the RRC connection request message (or in the RRC connection resume request message). For example, "1" means that the blind addition is required, "0" means no such requirement.

In one implementation, one field in the Establishment-Cause in the RRC connection request message (or the RRC connection resume request message) may be used to indicate that one of the causes of the RRC connection establishment (or RRC connection resume) is to execute the secondary addition (e.g., blind addition, normal addition).

In the present implementation, the EstablishmentCause may be reused for Narrow Band (NB) operations (e.g., NB Internet of Things (NB-IoT) in LTE network). However, the present disclosure is not limited thereto. In some implementations, when the cell N1 receives the blind addition request, the cell N1 may know that the UE 102 would like to report a cell selection result (e.g., a list of suitable cell IDs/zone IDs/area IDs) for the candidate secondary nodes in a subsequent RRC message (e.g., in the RRC connection setup complete message or in the RRC connection resume complete message).

In one implementation, the UE 102 may collect signal quality information for one or more cells, generate the cell selection result based on the signal quality information, and report the cell selection result to the master node (e.g., cell N1) via an RRC message (e.g., the RRC connection setup complete message or the RRC connection resume complete message). The cell selection result may indicate at least one candidate secondary node. For example, the cell selection result may include at least one of: cell ID, zone ID, and area ID to which the candidate secondary node corresponds.

As shown in action 404, the UE 102 may transmit an RRC connection setup complete message to the cell N1 to confirm that the RRC connection is established, for the RRC idle state to the RRC connected state transition.

The RRC connection setup complete message may include a cell selection result which contains at least one cell ID of the candidate secondary node (e.g., ID of cell N2). The cell ID may be, but not limited to, a physical cell ID (PCI), a global unique ID or a unique ID within the Mobility Management Entity (MME)/Access and Mobility Management Function (AMF). In response to the RRC connection setup complete message, the cell N1 may add the indicated candidate secondary cell N2 as the UE's secondary node. Although action 404 in FIG. 4 shows a transmission of the "RRC connection setup complete" message, the present disclosure is not limited thereto. In some implementations, the UE 102 may reply with an RRC connection resume complete message to the cell N1 in action 404, to confirm that the RRC connection is resumed, for the RRC inactive (or light connected) state to the RRC connected state transition. The message content included in the RRC connection setup complete message is also applicable to the RRC connection resume complete message.

In one implementation, the UE 102 may generate the cell selection result based on the signal quality information. For example, if the signal quality between the UE 102 and a cell is above a (pre)configured threshold value, the ID of the cell will be included in the cell selection result by the UE 102.

The threshold value and/or other required information for the UE 102 to report the list of cell IDs/zone IDs/area IDs may be configured by the cell N1 during the RRC connection establishment/resume procedure via the system information message (e.g., minimum System Information (SI), on demand SI, or other SIs). For example, the cell N1 may broadcast the threshold value. If the neighboring cell's signal strength (e.g. the Received Signal Strength Indication (RSSI), the Reference Signal Received Power (RSRP), or the Reference Signal Received Quality (RSRQ)) is above the threshold value, the UE 102 may provide such cell's ID in the reporting message (e.g., in the RRC connection setup complete message or in the RRC connection resume complete message).

In one implementation, the cell selection result may include more than one cell ID/zone ID/area ID. The cells indicated by the UE 102 in the RRC connection setup complete message (or in the RRC connection resume complete message) may be the UE's suitable cells that satisfy the UE's cell (re)selection criteria for choosing the secondary nodes. Upon receiving the list of cell IDs/zone IDs/area IDs indicated by the UE 102, the cell N1 may or may not filter them.

In one implementation, the cell N1 may inform the UE 102 of at least one of: a maximum number of reported cell IDs in the cell selection result, a maximum number of reported zone IDs in the cell selection result, and a maximum number of reported area IDs in the cell selection result. For example, an indication, such as "maxReportedCellIDs", may be configurable by the cell N1. The cell N1 may configure the indication maxReportedCellIDs according to the length of each cell ID and the size of the RRC connection setup complete message. The cell N1 may provide such indication via a system information broadcast message (e.g., minimum SI, on demand SI, or other SIs), or via the RRC connection setup message (or the RRC connection resume message). If the UE 102 receives the indication maxReportedCellIDs, the number of cell IDs included in the RRC connection setup complete message (or the RRC connection resume complete message) may not exceed the number indicated by maxReportedCellIDs. In another example, the UE 102 may report at least one zone ID (or area ID) in the RRC connection setup complete message (or the RRC connection resume complete message). The cell N1 may perform the procedure of blind addition request and response with at least one cell with the reported zone IDs (or area IDs). In yet another example, the UE 102 may report at least one zone ID (or area ID) and at least one cell ID in the RRC connection setup complete message (or in the RRC connection resume complete message). In such a case, the cell N1 may guarantee the secondary node added is tagged with the reported zone ID and belonged to one of the reported cell IDs. With the information of cell ID list and/or zone ID list, the cell N1 may perform the filtering mechanism to add the suitable cells for the UE 102.

In one implementation, the cell N1 may broadcast a period value (e.g., 100 millisecond (ms)). The UE 102 may provide the ID of a cell with good quality over such period in the reporting message (e.g., in the RRC connection setup complete message or in the RRC connection resume complete message). For example, the suitable cells reported may be any cells with good quality since N−100 ms, where N is the timing when the UE 102 sends the RRC connection setup complete message.

In one implementation, the cell N1 may specify the reporting order of the suitable cells (e.g., descending or ascending by RSSI value). For instance, the indication of "ascending" or "descending" may be configured in the RRC connection setup message, minimum SI, on demand SI, or other SIs. In such a case, the cell N1 may perform the filtering mechanism for the procedure of blind addition request and response based on the order.

In one implementation, the UE 102 may inform the cell N1 of the maximum number of secondary nodes that the UE 102 can support. For example, an indication, such as "maxAddedCells", may be sent from the UE 102 to the cell N1. Such indication may be included in the UE's capability (e.g., in a UE capability message). Alternatively, the UE may provide the indication maxAddedCells together with at least one cell ID in the RRC connection setup complete message to inform the cell N1 of the UE's maximum number of supported secondary nodes. For example, the cell N1 may add the first "maxAddedCells" cells if the descending order is configured.

In action 406, the cell N1 may perform blind addition request and response with the cell (e.g., the cell N2) indicated by the UE 102. If the cell ID list/zone ID list/area ID list is filtered by the cell N1, in this action, the cell N1 may only perform the procedure of blind addition request and response to the cells corresponding to the filtered cell IDs/zone IDs/area IDs.

During the procedure of blind addition request and response, the cell N1 may perform the coordination through an X2/Xn interface to the cells indicated by the at least one cell ID in the RRC connection setup complete message (or in the RRC connection resume complete message). The cells to which the cell N1 coordinates may or may be filtered by the cell N1. Further, the cells to which the cell N1 coordinates may have an X2/Xn interface with the cell N1. In such case, the cell N1 may not send the blind addition request message to all cells indicated by the UE 102.

In action 408, the cell N1 may transmit an RRC connection reconfiguration message to the UE 102. The RRC connection reconfiguration message may include the cell N2's configuration, and/or the required information to access the cell N2. Based on the configuration in the RRC connection reconfiguration message, the UE 102 may further add the cell N2 as a secondary node.

In one implementation, if the cell N1 receives the cell N2's configuration information, the cell N1 may or may not filter the cell N2's information. If the filtering mechanism is applied, the cell N1 may forward the configuration from cells not filtered or forward the configuration not filtered. For instance, the cell N1 may receive more than one RRC resource response message from different cells. The cell N1 may only forward the information in RRC resource response messages from one or more (less than or equal to "maxAddedCells") cells to the UE 102. Based on the configuration in the RRC connection reconfiguration message, the UE 102 may further add the cell N2 as the secondary node. Moreover, since the UE 102 may receive more than one RRC connection reconfiguration message, the UE 102 may add multiple secondary nodes. In such a case, one RRC connection reconfiguration message may correspond to one cell. In some implementations, the RRC connection reconfiguration message may correspond to more than one cells that the cell N1 receives the RRC resource response messages from.

In one implementation, one RRC connection reconfiguration message may include all configuration information for different cells. Thus, in such an RRC connection reconfiguration message, there may be fields to explicitly indicate the cell ID and its corresponding configuration. Alternatively, in such an RRC connection reconfiguration message, there may be fields to implicitly indicate the configuration. For example, the order of the configuration may map to the order of cell IDs in the list reported by the UE 102. In the implicit RRC connection reconfiguration message case, if the cell N1 does not provide the configuration information for one cell, the field which supposes to carry such configuration may be empty/null.

Table 1 shows an exemplary cell ID list reported by the UE 102. Table 2 shows fields of configurations contained in the RRC connection reconfiguration message. In this example, if the UE 102 reports the cell ID list in the RRC connection setup complete message, via the implicit RRC connection reconfiguration design, the order of configuration may correspond to the order of cell ID list. As shown in Table 1 and Table 2, the cell ID #1 may correspond to the configuration #1, and the cell ID #2 may correspond to the configuration #2.

TABLE 1

| Cell ID #1 | Cell ID #2 | Cell ID #3 |
| --- | --- | --- |

TABLE 2

| Configuration #1 | Configuration #2 | Empty/Null |
| --- | --- | --- |

If the cell N1 is not going to add the cell with the cell ID #3 as the secondary node, the field of configuration corresponds to the cell ID #3 in the RRC connection reconfiguration message may be empty/null or a default value.

In one implementation, the cell N1 may encapsulate the response from the cell N2 (e.g., the RRC resource response message) into the RRC connection reconfiguration message. In such case, the RRC resource response message can be considered as an inter-node RRC message.

In action 410, the UE 102 may transmit an RRC connection reconfiguration complete message to the cell N1 in response to the RRC connection reconfiguration message.

In action 412, the UE 102 may transmit an RRC connection setup complete message 412 to the secondary node (e.g., the cell N2), and build the RRC connection with the cell N2.

In action 414, the UE 102 may perform multi-connectivity data transmission with the cell N1 and the cell N2.

In one implementation, the UE 102 may receive multiple RRC connection reconfiguration messages from one or more cells. The UE 102 may or may not filter the RRC connection reconfiguration messages. If the UE 102 performs the filtering mechanism, the UE 102 may configure itself based on the RRC connection reconfiguration messages sent by the cells not filtered by the UE 102.

In one implementation, the UE 102 may filter the RRC connection reconfiguration messages, and/or may filter even the configuration in the same RRC connection reconfiguration message. For example, the cell N1 may provide the configuration information for cell ID #1 and cell ID #2. However, the UE 102 may only build the RRC connection to the cell with the cell ID #1. In such a case, the UE 102 may reply the cell N1 with the RRC connection reconfiguration complete message including the cell ID #2, to indicate that the cell with the cell ID #2 is not added. The cell N1 may further instruct the cell with the cell ID #2 to reset the configuration for the UE 102. In one implementation, the UE 102 may reply the cell N1 with the RRC connection reconfiguration complete message including the cell ID #1, to indicate that the cell with the cell ID #1 is successfully added. The cell N1 may further instruct the cell with the cell ID #2 to reset the configuration for the UE 102.

In one implementation, if none of the configurations of the secondary nodes is successfully configured, or if the "maxAddedCells" cell number is not successfully achieved, the secondary node addition (e.g., blind addition, normal addition) is considered unsuccessful. The UE 102 may further trigger the RRC connection re-establishment procedure to the cell N1.

Based on the received RRC connection reconfiguration message, the UE 102 may configure itself to connect to the cell N2. In one implementation, the UE 102 is provided with SRB configuration information in the cell N2, so that the UE 102 can build the RRC connection to the cell N2. The RRC connection may, for instance, be SRB3.

In one implementation, the UE 102 may send RRC messages (e.g., RRC connection request message, RRC connection setup complete message, and RRC connection reconfiguration complete message) to the cell N2 to add the cell N2 as the secondary node following the SRB configuration. The SRB configuration may include the configuration of a Packet Data Convergence Protocol (PDCP) entity, a Radio Link Control (RLC) entity, and a Medium Access Control (MAC) entity for SRB delivery. In these RRC messages, the UE 102 may provide its UE ID or any indicators provided by the cell N2 and forwarded by the cell N1 as the key to recognize the UE 102.

In one implementation, the UE 102 may be provided with a DRB configuration. The UE 102 may configure its data radio bearers and/or send data to the cell N2 based on the DRB configuration. The DRB configuration may include the configuration of a Service Data Adaptation Protocol (SDAP) entity, a PDCP entity, a RLC entity, and a MAC entity for DRB delivery.

In one implementation, the UE 102 may be provided with an SR configuration to the cell N2. The UE 102 may send scheduling request based on the SR configuration to the cell N2 for uplink resource grants and/or uplink request.

In one implementation, the UE 102 may be configured with a beam configuration for the cell N2. The UE 102 may configure the beams to transmit and/or receive the beam-level signal to the cell N2.

In one implementation, the UE 102 is configured with an association between RACH resources and NR-SS configuration, and/or the association between RACH resources and CSI-RS configuration. The UE 102 may perform random access procedure to the cell N2.

In one implementation, the UE 102 may be provided with an indicator of special access category. The UE 102 may access the cell N2 based on the indicator in the access control mechanism. For example, the barring parameters of the special access category is looser. For example, such special access category does not go through the access control mechanism, e.g., such special access category is not indicated in the access control parameters in the system information (e.g., SIB1). The configuration may, for instance, be a radio resource configuration including a physical configuration which includes a scheduling request configuration.

Figure 5:
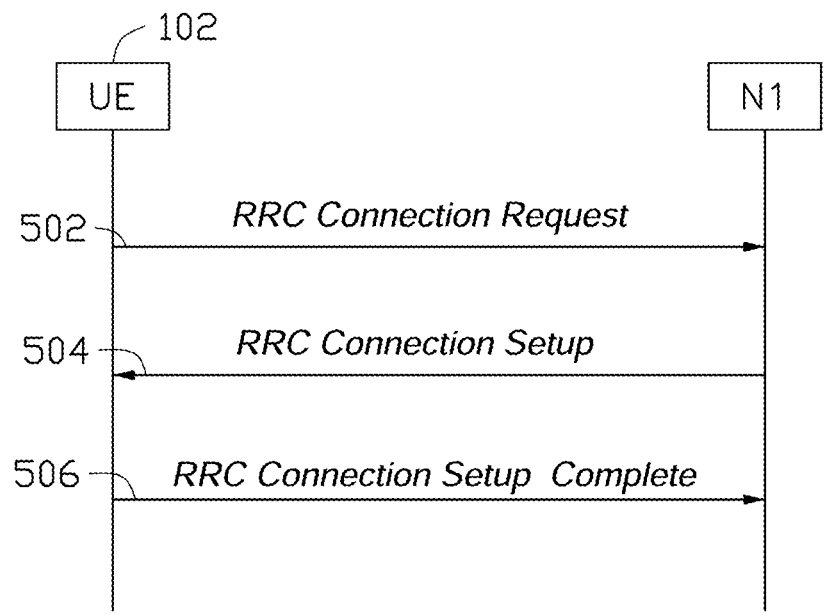
FIG. 5 is a message flow diagram illustrating operations performed between a UE and a master node, in accordance with an example implementation of the present disclosure.

FIG. 5 is a message flow diagram illustrating operations performed between a UE (e.g., a UE 102) and a master node (e.g., a cell N1), in accordance with an example implementation of the present disclosure.

In action 502, the UE 102 may send an RRC connection request to the cell N1. The RRC connection request may include a blind addition request for the blind addition.

In action 504, the cell N1 may reply with an RRC connection setup message (or an RRC connection resume message, for the RRC inactive (or light connected) state to the RRC connected transition) to the UE 102.

In one implementation, if the cell N1 supports the blind addition, the cell N1 may further ask the UE 102 for what it needs in the RRC connection setup message (or in the RRC connection resume message). If the cell N1 supports the blind addition, the cell N1 may allow the UE 102 to set up (or resume) the RRC connection and further report its suitable cell set. For example, the cell N1 may provide a radio resource dedicated configuration (e.g., having a radio bearer configuration, a PDPC configuration, an RLC configuration, a MAC configuration, and/or a PHY configuration) in the RRC connection setup message (or in the RRC connection resume message), to configure the UE 102 to establish an RRC connection to the cell N1.

In one implementation, if the cell N1 is to add the secondary nodes based on the list of cell IDs provided by the UE 102, the cell N1 may configure the indication, maxReportedCellIDs, in the RRC connection setup message (or in the RRC connection resume message) to inform the UE 102 of the maximum number of the cell IDs reported in the cell selection result. Thus, the cell N1 may add the secondary nodes based on the list of cell IDs.

In one implementation, if the cell N1 is to add the secondary nodes based on the list of zone IDs provided by the UE 102, the cell N1 may indicate the maxReportedZoneIDs in the RRC connection setup message (or in the RRC connection resume message) to inform the UE 102 of the maximum number of the zone IDs reported in the cell selection result. The cell N1 may then add the secondary nodes with the provided zone IDs.

In one implementation, if the cell N1 would add the secondary nodes based on the list of area IDs provided by the UE 102, the cell N1 may indicate the maxReportedAeraIDs in the RRC connection setup message (or in the RRC connection resume message) to inform the UE 102 of the maximum number of the area IDs reported in the cell selection result. The cell N1 may then add the secondary nodes with the provided area IDs.

In one implementation, if the UE 102 is in the RRC inactive (or light connected) state and stores the previous added secondary node information in the UE context, the cell N1 may indicate the UE 102 to add the previous secondary node in the UE context via an indicator in the RRC connection setup message (or in the RRC connection reconfiguration message). The cell N1 may already have the UE context and confirm that the secondary node is available to be added. If the UE 102 has added more than one secondary node, and the information of the more than one secondary node is stored in the UE context, the cell N1 may select the more than one secondary node (but less than maxAddedCells), and instruct the UE 102 to add them. In such a case, the UE 102 may not reply the cell N1 with the suggested (to be added) cell IDs.

In action 506, the UE 102 may transmit an RRC connection setup complete message (or an RRC connection resume complete message) including the cell selection result to the cell N1. The cell selection result may include, for instance, a cell ID list/zone ID list/area ID list indicating one or more suitable cells for being the secondary node(s).

Figure 6:
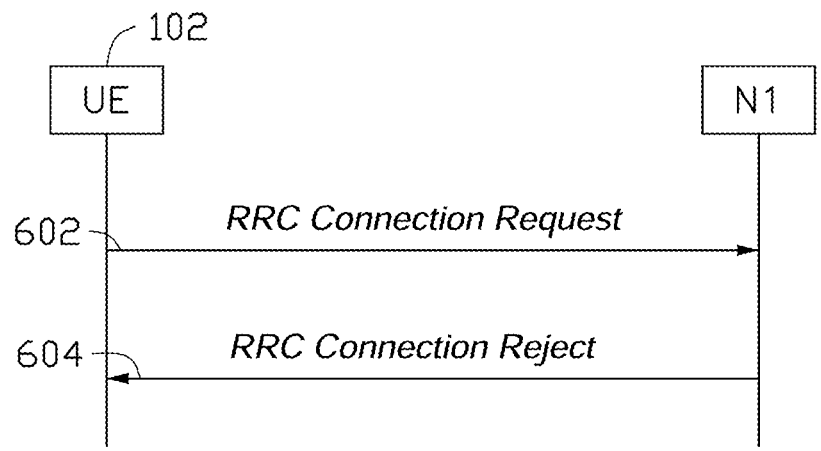
FIG. 6 is a message flow diagram illustrating operations performed between a UE and a master node, in accordance with an example implementation of the present disclosure.

FIG. 6 is a message flow diagram illustrating operations performed between a UE (e.g., a UE 102) and a master node (e.g., a cell N1), in accordance with an example implementation of the present disclosure.

In the present implementation, the cell N1 may reject the secondary node addition (e.g., blind addition, normal addition) with an RRC connection reject message. As shown in FIG. 6, in action 602, the UE 102 may send an RRC connection request message including a blind addition request to the cell N1. If the cell N1 rejects both the RRC establishment and the blind addition, then in action 604, the cell N1 may reply the UE 102 with an RRC connection reject message.

In another implementation, the cell N1 may reject the secondary node addition but accept the RRC connection establishment, thereby replying the UE 102 with an RRC connection setup message. In such case, the cell N1 may grant relative resources for the RRC establishment yet no secondary node addition. For example, the cell N1 may send the RRC connection setup message to acknowledge the admission of the RRC connection establishment, provide the radio resource configuration to build the RRC connection establishment, but only grant a sufficient size for the UE 102 to transmit the RRC connection setup complete message without any indication for blind addition, e.g., without appending the suitable cell ID list/zone ID list/area ID list. The radio resource configuration and suitable size for the RRC connection setup complete message may be included in a radio resource dedicated configuration.

In one implementation, if there is no indication for accepting the secondary node addition (e.g., blind addition, normal addition) or no information required for the secondary node addition in the RRC connection setup message, the UE 102 may know that the secondary node addition is rejected by the cell N1.

In one implementation, a normal secondary node addition (called "normal addition" for short) may, by default, take place when the secondary node addition (e.g., blind addition, normal addition) is rejected. Detailed description of the normal addition procedure will be illustrated in reference with FIG. 10.

In one implementation, the cell N1 may provide an indication of secondary node addition (e.g., blind addition, normal addition) in the RRC connection setup message to explicitly let the UE 102 know whether it is admitted to report the cell selection result (e.g., suitable cell ID list/zone ID list/area ID list) in the following reporting RRC message by checking the indication. For example, an indication of blind addition may be one bit, e.g., "1" means accepting the blind addition, "0" means rejecting the blind addition, or "0" means that the blind addition is rejected but the normal addition takes over.

Figure 7:
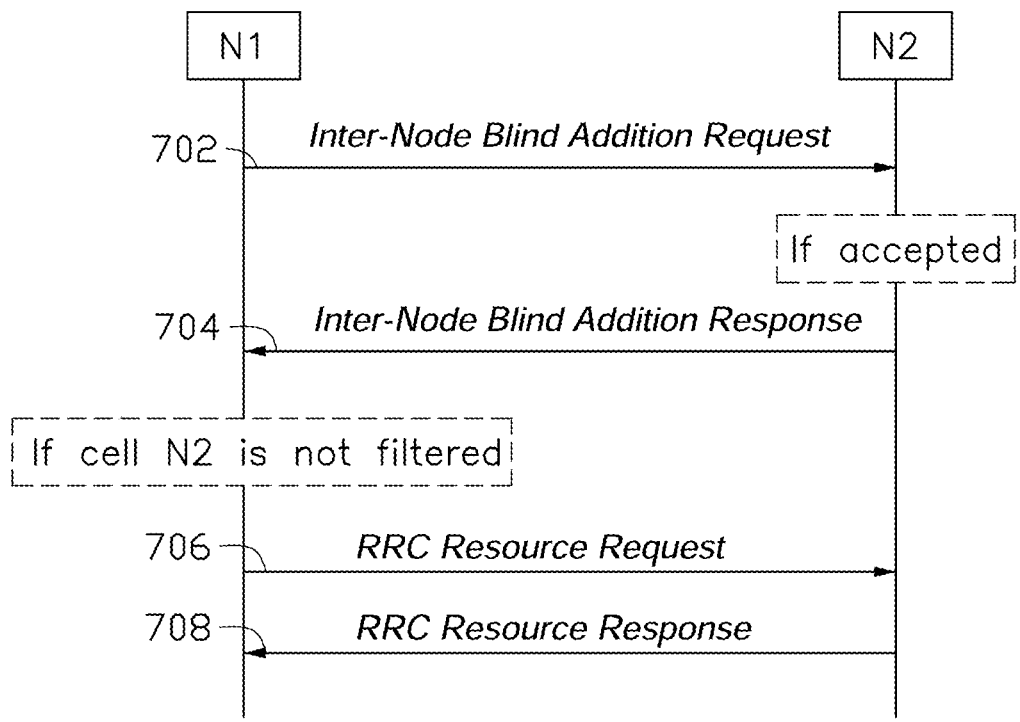
FIG. 7 is a message flow diagram illustrating a procedure for blind addition request and response, in accordance with an example implementation of the present disclosure.

FIG. 7 is a message flow diagram illustrating a procedure for blind addition request and response, in accordance with an example implementation of the present disclosure.

In action 702, a master node (e.g., a cell N1) may send an inter-node blind addition request to a cell (e.g., a cell N2).

The cell (e.g., cell N2) may be indicated by the UE 102 and not filtered out by the cell N1, if the cell N1 performs the filtering mechanism.

In one implementation, the inter-node blind addition request may include at least one UE ID (e.g., ID of the UE 102), so as to inform the cell N2 of which UE needs the RRC connection and/or data transmission to the cell N2.

In one implementation, the cell N1 may send the inter-node blind addition request to multiple cells simultaneously.

In action 704, the cell N2 may reply an inter-node blind addition response with a positive feedback (e.g., an ACK (acknowledgement) indication) to the cell N1, if the blind addition is accepted by the cell N2 (e.g., the cell N2 determines that it can support the UE's requirement(s)).

In one implementation, the cell N2 may, in response to the inter-node blind addition request, check with the core network about the UE's subscription and/or service requirement via the UE ID.

After receiving the positive feedback from the cell N2, it is possible that the cell N1 may further ask for the configuration to access and/or build the RRC connection and/or perform data transmission to the cell N2. Thus, in action 706, the cell N1 may further send an RRC resource request to the cell N2.

In one implementation, the cell N1 may or may not filter the cells sending the positive feedback. For example, if the cell N2 is filtered out by the cell N1, the cell N2 may not receive the RRC resource request, even if the cell N2 replies with an ACK in the inter-node blind addition response. On the contrast, if the cell N2 is not filtered or the cell N1 does not perform the filtering mechanism, the cell N2 may receive the RRC resource request from the cell N1. The RRC resource request may include, for instance, a UE ID for the cell N2 to identify.

In action 708, the cell N2 may send an RRC resource response to the cell N1.

In one implementation, several pieces of information may be included in the RRC resource response, for the UE 102 to access and/or build the RRC connection and/or perform data transmission with the cell N2. The information may be at least one of: a UE ID, an SRB configuration for the UE 102, a DRB configuration for the UE 102, an SR configuration, a beam configuration, an association between RACH resources and NR-SS configuration, an association between RACH resources and CSI-RS configuration, and an indication of special access category. The purpose of the information may be to assist the UE 102 for adding the cell N2 as a secondary node. The SRB configuration may comprise the configuration for the UE to set up the SRB3 between the UE and the cell N2.

In one implementation, the cell N2 may be configured with a timer. The timer may be activated when the cell N2 accepts the request from the cell N1 (e.g., upon the cell N2 sends the inter-node blind addition response with a positive feedback (e.g., ACK)), or when the cell N2 prepares/reserves the resources for the UE 102 (e.g., upon the cell N2 sends the RRC resource response with configurations). If the timer expires and the cell N2 does not receive the UE's further information or response, the cell N2 may clear the configuration and/or release the resources for the UE 102. Alternatively, the cell N2 may bar the UE 102. In one implementation, the timer is configured by the cell N1 to the cell N2, e.g., via inter-node blind addition request. In one implementation, the timer is configured by the cell N2 itself. In one implementation, the cell N2 sends the timer to the cell N1 via inter-node blind addition response.

Although the procedure of blind addition request and response illustrated in FIG. 7 includes four actions 702, 704, 706 and 708, the present disclosure is not limited thereto. In one implementation, the procedure may be generalized into two actions: one is that the master node (e.g., cell N1) transmits the secondary node addition request to the secondary node (e.g., cell N2), and the other is that the master node receives the secondary node addition response from the secondary node. The secondary node addition request may be configured to request the preparation of resources for secondary node addition for a specific UE (e.g., UE 102). For example, the secondary node addition request may be an inter-node blind addition request or an RRC connection resource request. In one implementation, the secondary node addition request may include at least one of the following: timer and UE ID.

The secondary node addition response may be configured to confirm the master node about the secondary node addition, and provide the required configuration information for the UE 102 to access the secondary node. For example, the secondary node addition response may be an inter-node blind addition response or an RRC connection resource response. As discussed in FIG. 4, the secondary node addition response may include, for instance, at least one of: a timer, a UE ID, a beam configuration, an association between RACH resources and CSI-RS configuration, an association between RACH resources and NR-SS configuration, an SRB configuration, a DRB configuration, an SR configuration, and an indication of access category in the cell N2.

Figure 8:
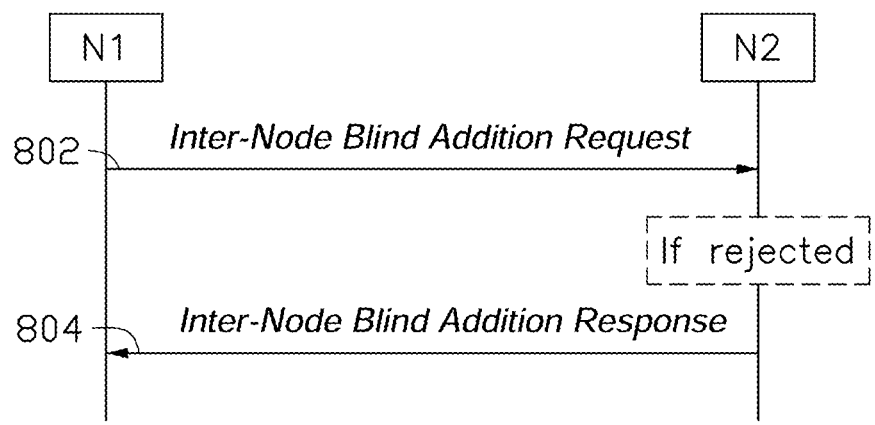
FIG. 8 is a message flow diagram illustrating a procedure for blind addition request and response, in accordance with an example implementation of the present disclosure.

FIG. 8 is a message flow diagram illustrating a procedure for blind addition request and response, in accordance with another example implementation of the present disclosure.

In the present implementation, if the cell N2 rejects the secondary node addition, the cell N2 may reply an inter-node blind addition response with a negative feedback (e.g., an NACK indication) to the cell N1.

As shown in FIG. 8, in action 802, a cell N1 may transmit the inter-node blind addition request to a cell N2. Action 802 may substantially correspond to action 702 in FIG. 7, so the detailed description of this action is omitted.

In action 804, the cell N2 may reply an inter-node blind addition response with a negative feedback (e.g., an NACK indication) to the cell N1, if the cell N2 rejects the requested secondary node addition. For example, the blind addition may be rejected because the cell N2 cannot support the UE 102's requirement(s). In such a case, the cell N2 may reply to the cell N1 with a negative feedback (e.g., an NACK indication) in the inter-node blind addition response message.

Figure 9:
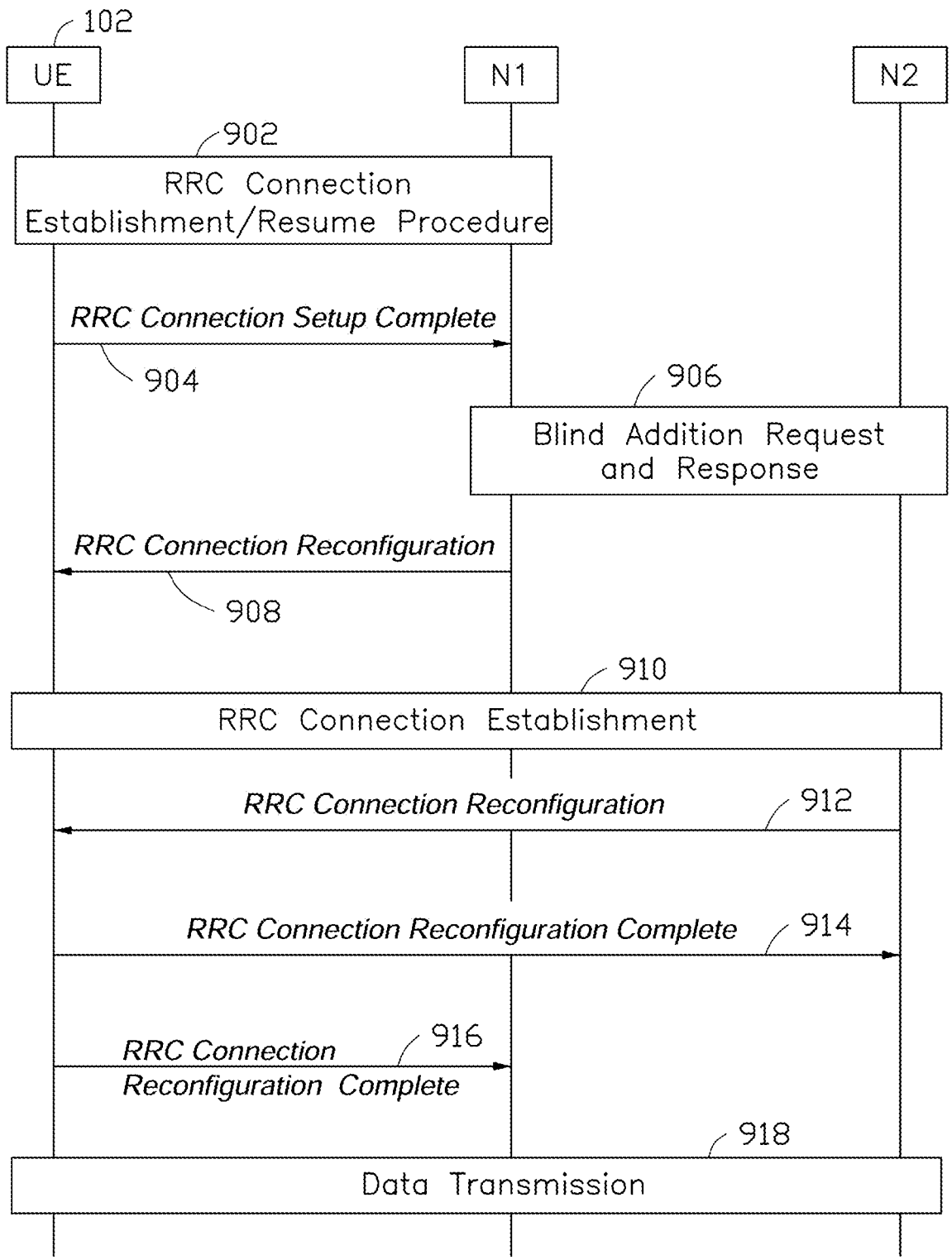
FIG. 9 is a message flow diagram illustrating operations performed among a UE, a master node and a secondary node, in accordance with an example implementation of the present disclosure.

FIG. 9 is a message flow diagram illustrating a secondary node blind addition procedure, in accordance with an example implementation of the present disclosure.

In action 902, a UE 102 may perform an RRC connection establishment/resume procedure with a cell N1, for RRC idle to RRC connected transition, or for RRC inactive (or light connected) to RRC connected transition.

In action 904, the UE 102 may send an RRC connection setup complete message including a cell selection result to the cell N1.

In action 906, the cell N1 may perform a procedure of blind addition request and response with the cell N2 in response to the received RRC connection setup complete message.

In action 908, the cell N1 may forward a first RRC connection reconfiguration message to the UE 102.

In one implementation, the first RRC connection reconfiguration message may include an indication to add the cell N2 (e.g., cell ID of the cell N2), and/or the required information to access the cell N2 (e.g., a beam configuration, and/or an association between RACH resources and CSI-RS configuration, and/or an association between RACH resources and NR-SS configuration, and/or an indication of special access category in the cell N2).

In response to the first RRC connection reconfiguration message, the UE 102 may then perform an RRC connection establishment procedure with the cell N2, as shown in action 910.

In action 912, the cell N2 may configure the UE 102 with SCG/SN-specific configuration (e.g., an SRB configuration, and/or a DRB configuration, and/or an SR configuration in the cell N2) via a second RRC connection reconfiguration message. The SRB configuration may comprise SRB3 configuration.

If the UE 102 adds the cell N2 successfully, the UE 102 may send an RRC connection reconfiguration complete message to the cell N2 and the cell N1, respectively, as shown in actions 914 and 916.

In action 918, the UE 102 may perform data transmission with the cell N1 and the cell N2 for multi-connectivity.

In some cases, the secondary node addition (e.g., blind addition, normal addition) is not guaranteed to be successful. For example, if the UE 102 fails to build an RRC connection to the cell N2, the UE 102 may declare a secondary node addition failure to the cell N1. In another example, if the UE 102 fails to add "maxAddedCells" secondary nodes, the UE 102 may declare a secondary node addition failure to the cell N1.

In one implementation, if the UE 102 cannot build the RRC connection to and/or transmit data to any (to be added) secondary nodes, the UE 102 may declare a secondary node addition failure. For example, the UE 102 may declare the secondary node addition failure in the RRC message (e.g., RRC connection reconfiguration complete message, RRC connection reestablishment request message). For example, one bit or a string in the RRC connection reconfiguration complete message may be the indicator of the secondary node addition failure.

In one implementation, the UE 102 may further include the cell IDs of cells which cause the secondary node addition failure, and/or provide the cause of failure (e.g. insufficient channel quality, timer expiry (e.g., running out of time before sending the RRC connection reconfiguration complete message), and no response from the cell N2) in the RRC message (e.g., RRC connection reconfiguration complete message, RRC connection reestablishment request message). In one implementation, the result of no response from the cell N2 may come from a timer in the cell N2 times out. The timer may be activated by the cell N2 when the cell N2 grants or reserves the resources/configuration to the UE 102, e.g., either during the RRC connection establishment/resume procedure (e.g., upon the transmission of the RRC resource response), or when the UE 102 accesses the cell N2. In one implementation, the UE starts the timer when the UE receives the RRC connection reconfiguration message from the cell N1 or cell N2, if this timer is included in the RRC connection reconfiguration message.

If the timer times out in the cell N2, which means the cell N2 does not receive the response from the UE 102 before the timer stops or expires, the cell N2 may further reject or bar the UE 102. In one implementation, if the timer in the cell N2 times out, the cell N2 may not reply to the UE 102 even when the UE 102 sends messages to the cell N2, resulting the secondary node addition failure. In one implementation, if the timer in the cell N2 times out, the cell N2 may reply to the UE 102 with an RRC reject message, resulting the secondary node addition failure.

In one implementation, the cell N1 may coordinate with the unsuccessful cells and request them to release the configuration and resources for the UE 102 by using the combination of at least cell IDs and/or UE IDs.

In one implementation, if the secondary node addition failure is declared when all suggested secondary nodes with configurations (e.g., provided in the RRC connection reconfiguration message) fail, the UE 102 may not provide the cell IDs in the RRC message (e.g., RRC connection reconfiguration complete message, RRC connection reestablishment request message) to the cell N1.

Once a secondary node addition fails, the UE 102 may give up adding the secondary nodes, may continue on with the blind addition, or may switch to the normal addition. The normal addition is based on the UE's measurement report. If the UE 102 continues on the blind addition, the UE 102 may provide the cell selection result (e.g., a list of cell IDs or zone IDs) in the RRC connection reconfiguration complete message based on the latest measurement results. Upon receiving the RRC connection reconfiguration complete message, the cell N1 may perform the procedure of blind addition request and response to those cells indicated by the UE 102, and/or to those cells tagged with the zone IDs (or area IDs) indicated by the UE 102.

In one implementation, the UE 102 may provide at least one field in the reporting message to indicate its subsequent behavior(s). For example, if the field is "1", the UE 102 may continue performing the blind addition. If the field is "0", the UE 102 may perform the normal addition. If the field is "null" (empty), the UE 102 may not add the secondary node at this time.

Figure 10:
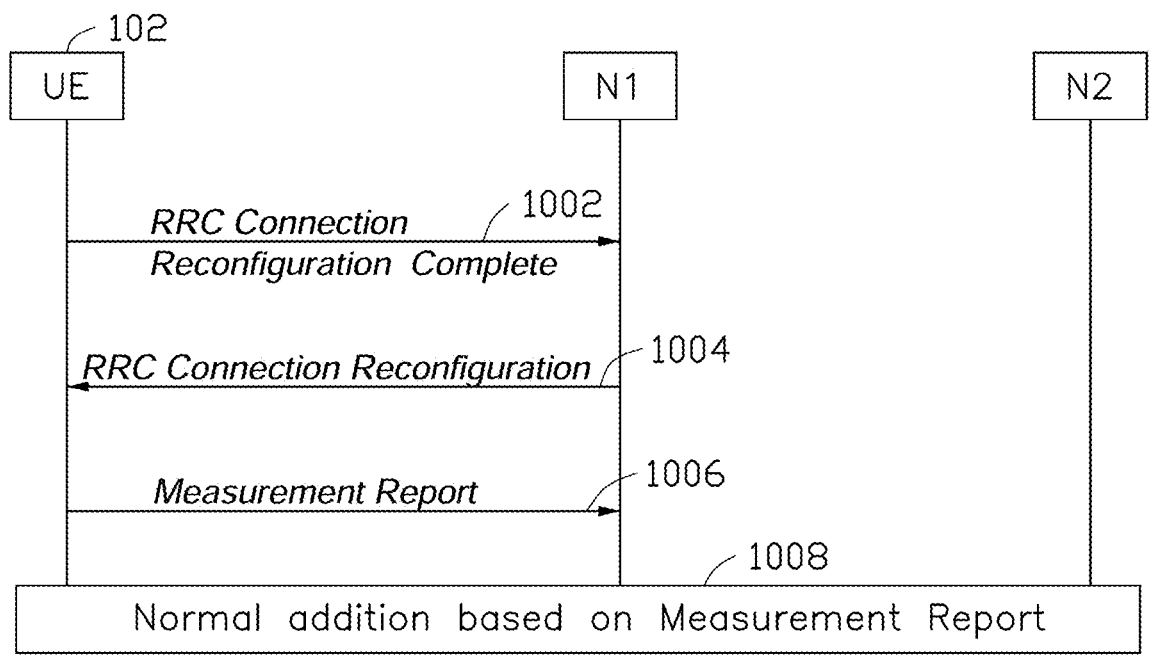
FIG. 10 is a message flow diagram illustrating a normal secondary node addition procedure, in accordance with an example implementation of the present disclosure.

FIG. 10 is a message flow diagram illustrating a normal addition procedure, in accordance with an example implementation of the present disclosure.

In the present implementation, a UE 102 may indicate to perform a normal addition after a secondary node addition (e.g., blind addition, normal addition) failure.

As shown in FIG. 10, in action 1002, the UE 102 may send an RRC connection reconfiguration complete message to a cell N1. The RRC connection reconfiguration complete message may include an indication of normal addition, e.g., 1 bit, to inform the cell N1. Alternatively, by default, the indication of secondary node addition failure may represent an indication of normal addition request.

Once the cell N1 receives the UE 102's normal addition requirement in an RRC connection reconfiguration complete message, in action 1004, the cell N1 may configure measurements for the UE 102 in the RRC connection reconfiguration message. For instance, the RRC connection reconfiguration message may include a measurement configuration. In one implementation, the UE sends the RRC message (e.g., RRC connection reconfiguration message, RRC connection reestablishment request message) including the addition failure, to the cell N1. The cell N1 would reply to the UE with an RRC message (e.g., RRC connection reconfiguration message) including measurement configuration.

In action 1006, the UE 102 may perform the measurements based on the measurement configuration, and send a measurement report including the measurement results to the cell N1.

In action 1008, the cell N1 may perform the normal addition based on the measurement report, and add a cell N2 as a secondary node for the UE 102 accordingly.

In one implementation, when the secondary node addition is successful, the UE 102 may acknowledge the status via the RRC connection reconfiguration complete message. The master node (e.g., cell N1) may further configure relative measurements toward the secondary node (e.g., cell N2) that be successfully added during the secondary node addition procedure.

In one implementation, the cell N1 may perform the blind addition without receiving the UE's suggested cell selection result (e.g., list of cell IDs/zone IDs/area IDs). This type of blind addition can be referred to as "master-node-initiated blind addition." For example, the cell N1 may directly send the RRC connection reconfiguration message to the UE 102. The RRC connection reconfiguration messages may include at least one of: the cell N2's configuration (e.g., the SN/SCG-specific configuration), the indication to add the cell N2, and the required information to access the cell N2. The SN/SCG-specific configuration may be provided by the cell N2. The RRC connection reconfiguration message may encapsulate the SN-SCG-specific configuration sent from the cell N2 to the cell N1, e.g., via inter-node SN addition response.

In one implementation, the UE 102 may already have the secondary node's information (e.g., the UE keeps the MC-related configuration in the UE context) when the UE 102 goes to the RRC inactive (or light connected) state. For example, the MC-related information can be the radio bearer configuration and/or the SCG configuration of the secondary nodes or secondary cells. In such a case, if the cell N1 has the UE context, the cell N1 may notify the UE 102 to add the secondary node (e.g., cell N2).

In the master-node-initiated blind addition, the UE 102 may base on the configuration in the RRC connection reconfiguration message to add the secondary nodes. If the addition is successful, the UE 102 may build the RRC connection to the cell N2 via an RRC message (e.g., RRC connection setup complete message).

In one implementation, the master-node-initiated blind addition may include the actions since the block of "blind addition request and response" in FIG. 4 or FIG. 9. For example, if the addition is successful, the UE 102 may send the RRC connection reconfiguration complete message to indicate the success of blind addition. If the blind addition fails, the UE 102 may indicate the blind addition failure in the RRC connection reconfiguration complete message to inform the cell N1.

According to the implementation, the failure of master-node-initiated blind addition can be handled in a manner similar to the UE-assisted blind addition. For example, a blind addition failure can be by default followed by a normal addition. In such case, the UE 102 may indicate the blind addition failure to the cell N1, implicitly representing for the request of normal addition. In another example, the UE 102 may indicate the blind addition failure in the RRC connection reconfiguration complete message (e.g., by using one bit). The UE 102 may further indicate the request of the blind addition or the request of the normal addition (e.g., "1" bit means the request of the blind addition, and "0" bit means the request of the normal addition). In yet another example, the UE 102 may indicate the blind addition failure in the RRC connection reconfiguration complete message (e.g., by using one bit), and the cell N1 may initiate the normal addition by configuring relative measurements after the RRC connection establishment.

Figure 11:
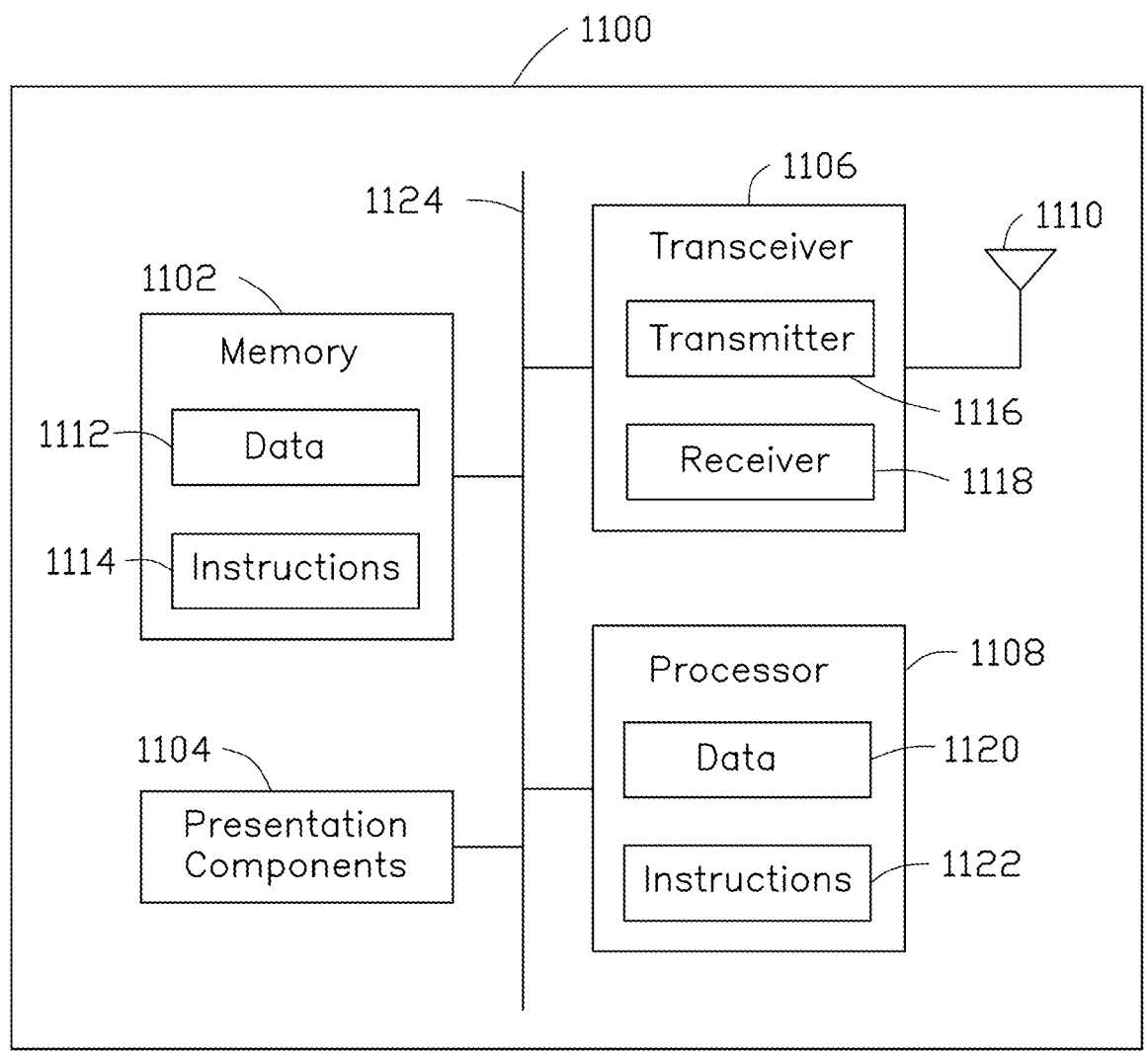
FIG. 11 is a block diagram illustrating a radio communication equipment, in accordance with an exemplary implementation of the present application.

FIG. 11 is a block diagram illustrating a radio communication equipment, in accordance with an exemplary implementation of the present application. The radio communication equipment may be a UE, a base station, or a network node as shown and described in the disclosure.

As shown in FIG. 11, the radio communication equipment 1100 may include a transceiver 1106, a processor 1108, a memory 1102, one or more presentation components 1104, and at least one antenna 1110. The radio communication equipment 1100 may also include an RF spectrum band module, a base station communications module, a network communications module, and a system communications management module, input/output (I/O) ports, I/O components, and power supply (not explicitly shown in FIG. 11). Each of these components may be in communication with each other, directly or indirectly, over one or more buses 1124.

The transceiver 1106 having a transmitter 1116 and a receiver 1118 may be configured to transmit and/or receive time and/or frequency resource partitioning information. In some implementations, the transceiver 1106 may be configured to transmit in different types of subframes and slots including, but not limited to, usable, non-usable and flexibly usable subframes and slot formats. The transceiver 1106 may be configured to receive data and control channels.

The radio communication equipment 1100 may include a variety of computer-readable media. Computer storage media may include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media may not comprise a propagated data signal. Communication media may typically embody computer-readable instructions, data structures, program modules or other data in a modulated data signal such as a carrier wave or other transport mechanism and include any information delivery media.

The memory 1102 may include computer-storage media in the form of volatile and/or non-volatile memory. The memory 1102 may be removable, non-removable, or a combination thereof. Example memory may include solid-state memory, hard drives, optical-disc drives, etc. As illustrated in FIG. 11, the memory 1102 may store data 1112 and computer-readable, computer-executable instructions 1114 (e.g., software codes) that are configured to, when executed, cause the processor 1108 to perform various functions described herein. Alternatively, the instructions 1114 may not be directly executable by the processor 1108 but be configured to cause the radio communication equipment 1100 (e.g., when compiled and executed) to perform various functions described herein.

The processor 1108 may include a central processing unit (CPU), a microcontroller, an ASIC, an intelligent hardware device, or any combination thereof configured to perform the functions described herein. The processor 1108 may process data 1120 and instructions 1122 received from the memory 1102, and information through the transceiver 1106, the base band communications module, and/or the network communications module. The processor 1108 may also process information to be sent to the transceiver 1106 for transmission through the antenna 1110.

One or more presentation components 1104 may present data indications to a person or other devices. Examples of one or more presentation components 1104 may include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A User Equipment (UE) comprising:
   one or more non-transitory computer-readable media having computer-executable instructions embodied thereon; and
   at least one processor coupled to the one or more non-transitory computer-readable media, and configured to execute the computer-executable instructions to:
   receive, from a master node, a Radio Resource Control (RRC) connection reconfiguration message comprising Secondary Cell Group (SCG) information provided by a secondary node before establishing a Signaling Radio Bearer 3 (SRB3) connection with the secondary node, the SCG information including at least one configuration for an SCG;
   establish the SRB3 connection with the secondary node based on the at least one configuration for the SCG; and
   add the SCG in response to the RRC connection reconfiguration message.

2. The UE according to claim 1, wherein the at least one configuration for the SCG includes an SRB3 configuration for the SCG and a Service Data Adaptation Protocol (SDAP) configuration for the SCG.

3. The UE according to claim 1, wherein the at least one processor is further configured to execute the computer-executable instructions to:
   initiate a secondary node addition procedure for the UE by transmitting a blind addition request to the master node in one of an RRC connection request message and an RRC connection resume request message; and
   receive a blind addition response from the master node in one of an RRC connection setup message and an RRC connection resume message.

4. The UE according to claim 3, wherein the at least one processor is further configured to execute the computer-executable instructions to:
   transmit a cell selection result to the master node in one of an RRC connection setup complete message and an RRC connection resume complete message after transmitting the blind addition request to the master node.

5. The UE according to claim 4, wherein the cell selection result comprises at least one of a cell identity (ID), a zone ID and an area ID.

6. The UE according to claim 5, wherein the blind addition response indicates at least one of:
   a maximum number of reported cell IDs in the cell selection result;
   a maximum number of reported zone IDs in the cell selection result; and
   a maximum number of reported area IDs in the cell selection result.

7. The UE according to claim 1, wherein the at least one processor is further configured to execute the computer-executable instructions to:
   transmit a UE capability message to the master node, the UE capability message indicating a maximum number of secondary nodes that the UE is capable of supporting.

8. A method performed by a User Equipment (UE), the method comprising:
   receiving, from a master node, a Radio Resource Control (RRC) connection reconfiguration message comprising Secondary Cell Group (SCG) information provided by a secondary node before establishing a Signaling Radio Bearer 3 (SRB3) connection with the secondary node, the SCG information including at least one configuration for an SCG;
   establishing the SRB3 connection with the secondary node based on the at least one configuration for the SCG; and
   adding the SCG in response to the RRC connection reconfiguration message.

9. The method according to claim 8, wherein the at least one configuration for the SCG includes an SRB3 configuration for the SCG and a Service Data Adaptation Protocol (SDAP) configuration for the SCG.

10. The method according to claim 8, further comprising:
    initiating a secondary node addition procedure for the UE by transmitting a blind addition request to the master node in one of an RRC connection request message and an RRC connection resume request message; and
    receiving a blind addition response from the master node in one of an RRC connection setup message and an RRC connection resume message.

11. The method according to claim 10, further comprising:
    transmitting a cell selection result to the master node in one of an RRC connection setup complete message and an RRC connection resume complete message after transmitting the blind addition request to the master node.

12. The method according to claim 11, wherein the cell selection result comprises at least one of a cell identity (ID), a zone ID and an area ID.

13. The method according to claim 12, wherein the blind addition response indicates at least one of:
    a maximum number of reported cell IDs in the cell selection result;
    a maximum number of reported zone IDs in the cell selection result; and
    a maximum number of reported area IDs in the cell selection result.

14. The method according to claim 8, further comprising:
    transmitting a UE capability message to the master node, the UE capability message indicating a maximum number of secondary nodes that the UE is capable of supporting.

* * * * *